US012806746B2

(12) United States Patent
Chew et al.

(10) Patent No.: US 12,806,746 B2
(45) Date of Patent: Nov. 24, 2026

(54) WHEELIE BAR WRENCH SYSTEM

(71) Applicant: Chew Motorsports & Machine LLC, Fayette, MO (US)

(72) Inventors: Myles Anthony Chew, Fayette, MO (US); Ethan Emanuel Chew, Armstrong, MO (US); Philip Robert DiMuzio, Myrtle Beach, SC (US)

(73) Assignee: Chew Motorsports & Machine LLC, Fayette, MO (US)

( * ) Notice: Subject to any disclaimer, the term of this patent is extended or adjusted under 35 U.S.C. 154(b) by 315 days.

(21) Appl. No.: 18/654,491

(22) Filed: May 3, 2024

(65) Prior Publication Data

US 2024/0367293 A1 Nov. 7, 2024

Related U.S. Application Data

(60) Provisional application No. 63/463,774, filed on May 3, 2023.

(51) Int. Cl.
*B25B 13/48* (2006.01)
*G01B 11/06* (2006.01)

(52) U.S. Cl.
CPC .......... *B25B 13/48* (2013.01); *G01B 11/0608* (2013.01)

(58) Field of Classification Search
CPC ............................ B25B 13/48; G01B 11/0608
USPC ............................................................ 81/119
See application file for complete search history.

(56) References Cited

U.S. PATENT DOCUMENTS

| | | | | | |
|---|---|---|---|---|---|
| 1,589,763 | A * | 6/1926 | Ratcliff | B25B 13/5058 | 81/103 |
| 6,301,997 | B1 * | 10/2001 | Welte | B25H 1/0092 | 33/286 |
| 6,854,361 | B2 * | 2/2005 | Vandergaw | B67B 7/18 | 81/3.4 |
| 7,331,672 | B2 * | 2/2008 | Spediacci | A61B 3/135 | 351/214 |
| 7,908,750 | B2 * | 3/2011 | Goick | A23G 3/0097 | 33/286 |
| 8,408,911 | B2 * | 4/2013 | Gray | B62H 7/00 | 434/61 |
| 8,616,098 | B1 * | 12/2013 | Rosow | B25G 1/102 | 81/489 |
| 2003/0042217 | A1 * | 3/2003 | Berry | B25H 3/04 | 211/70.6 |

* cited by examiner

*Primary Examiner* — Hadi Shakeri
(74) *Attorney, Agent, or Firm* — STINSON LLP

(57) ABSTRACT

A wheelie bar wrench system is configured for adjusting a height of a wheelie bar. The wheelie bar wrench system includes a wrench and a slider assembly. The wrench includes a shaft portion including a plurality of detents spaced along a longitudinal axis of the wrench. The slider assembly includes a slider body, a retractable device, and a laser device. The slider body includes a shaft opening configured to receive the shaft portion therein such that the slider assembly is moveable along the shaft portion. The retractable device extends through a first opening defined through the slider body and selectively engages the detents in the shaft portion as the slider assembly moves along the shaft portion. The laser device extends through a second opening defined through the slider body and is configured to emit a laser beam for use in adjusting the height of the wheelie bar.

18 Claims, 6 Drawing Sheets

WHEELIE BAR WRENCH SYSTEM

CROSS-REFERENCE TO RELATED APPLICATIONS

This application claims the benefit of U.S. Provisional Patent Application Ser. No. 63/463,774, filed on May 3, 2023, the entire contents of which are hereby incorporated by reference.

FIELD

The present disclosure generally relates to a wheelie bar wrench used for adjusting a wheelie bar in drag racing.

BACKGROUND

Wheelie bars are installed at a rear end of a drag racing chassis to provide stability to the vehicle during wheelies and/or facilitate steering. As wheelie bars play an essential role in protecting both the driver and the vehicle from potential damages, it is crucial for the wheelie bar height to be set properly. Errors in wheelie bar height may result in failed runs or even crashes. However, a challenge with conventional wheelie bar wrenches lies in their accuracy. For example, at least some known wheelie bar wrenches are prone to providing flawed measurements due to difficulties in maintaining a stable, upright position. Additionally, at least some known wheelie bar wrenches rely on subjective "eyeballing" techniques, where users estimate measurements using height markings on the wrench, thereby increasing the risk of errors.

SUMMARY

Aspects of the present disclosure provide for an improved wheelie bar wrench with adjustable wheel positioning lasers.

In one aspect, a wheelie bar wrench system is provided for use in adjusting a height of a wheelie bar. The wheelie bar wrench system includes a wrench and a slider assembly. The wrench includes a shaft portion. The shaft portion extends along a longitudinal axis of the wrench and has a front face and a rear face. The front face of the shaft portion has a plurality of detents defined therein spaced along the longitudinal axis of the wrench. The slider assembly includes a slider body, a retractable device, and a laser device. The slider body includes a front wall, a rear wall, and a sidewall extending therebetween. The retractable device extends through a first opening defined in the front wall, and the laser device extends through a second opening defined in the sidewall. An inner surface of the front wall, the rear wall, and the sidewall defines a shaft opening configured to receive the shaft portion of the wrench therein such that the slider assembly is moveable longitudinally along the shaft portion of the wrench. The retractable device is configured to move between a retracted position and an extended position such that the retractable device selectively engages the plurality of detents as the slider assembly is moved longitudinally along the shaft portion of the wrench. The laser device is configured to emit a laser beam for use in adjusting the height of the wheelie bar.

In another aspect, a wheelie bar wrench system is provided for use in adjust a height of a wheelie bar. The wheelie bar wrench system includes a wrench, a first slider assembly, and a second slider assembly. The wrench includes a first shaft portion and a second shaft portion. The first shaft portion and the second shaft portion each extend along a longitudinal axis of the wrench and having a front face and a rear face. The front face of the first shaft portion has a first plurality of detents defined therein spaced along the longitudinal axis of the wrench, and the rear face of the second shaft portion has a second plurality of detents defined therein spaced along the longitudinal axis of the wrench. The first slider assembly includes a first slider body, a first retractable device, and a first laser device. The first slider body includes a first front wall, a first rear wall, and a first sidewall extending therebetween. The first retractable device extends through a first slider opening defined in the first front wall, and the first laser device extends through a first laser opening defined in the first sidewall. An inner surface of the first front wall, the first rear wall, and the first sidewall defines a first shaft opening configured to receive the first shaft portion of the wrench therein such that the first slider assembly is moveable longitudinally along the first shaft portion of the wrench. The first retractable device is configured to move between a retracted position and an extended position such that the first retractable device selectively engages the first plurality of detents as the first slider assembly is moved longitudinally along the first shaft portion of the wrench. The first laser device is configured to emit a first laser beam in a first direction for use in adjusting the height of the wheelie bar. The second slider assembly includes a second slider body, a second retractable device, and a second laser device. The second slider body includes a second front wall, a second rear wall, and a second sidewall extending therebetween. The second retractable device extends through a second slider opening defined in the second rear wall, and the second laser device extends through a second laser opening defined in the second sidewall. An inner surface of the second front wall, the second rear wall, and the second sidewall defines a second shaft opening configured to receive the second shaft portion of the wrench therein such that the second slider assembly is moveable longitudinally along the second shaft portion of the wrench. The second retractable device is configured to move between a retracted position and an extended position such that the retractable device selectively engages the second plurality of detents as the second slider assembly is moved longitudinally along the second shaft portion of the wrench. The second laser device is configured to emit a second laser beam in a second direction opposite the first direction for use in adjusting the height of the wheelie bar.

In another aspect, a method is provided for forming a wheelie bar wrench system. The method includes providing a slider body including a front wall, a rear wall, and a sidewall extending therebetween. The front wall includes a first opening defined therethrough. The sidewall includes a second opening defined therethrough. An inner surface of the front wall, the rear wall, and the sidewall defines a shaft opening. A retractable device is extended at least partially through the first opening defined through the front wall of the slider body such that the slider body is configured to move the retractable device with the slider body. The retractable device is configured to move between a retracted position and an extended position. A shaft portion of a wrench is extended through the shaft opening defined by the inner surface of the front wall, the rear wall, and the sidewall of the slider body such that the slider body is moveable longitudinally along the shaft portion of the wrench and such that the retractable device is configured to selectively engage a plurality of detents defined in a front face of the shaft portion as the slider body is moved longitudinally along the shaft portion of the wrench. A laser device is extended at least partially through the second opening defined through the sidewall of the slider body such that the slider body is configured to move the laser device with the slider body. The laser device is configured to emit a laser beam for use in adjusting the height of the wheelie bar.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

The present disclosure generally pertains to a wheelie bar wrench system that may be used for adjusting a height of a wheelie bar on a drag racing car. As with prior wheelie bar wrenches, the wheelie bar wrench system of the present disclosure is configured to grip a portion of a wheelie bar rod of a wheelie bar, and tighten or loosen, i.e., untighten, the wheelie bar rod for adjusting a height of one or more wheelie bar wheels on the wheelie bar. As described herein, the wheelie bar wrench system of the present disclosure allows for many of the typical wheelie bar wrench functions, and includes additional features to ensure proper alignment and/or height of the wheelie bar wheels to ensure driver safety and protect the car from damages.

Figure 1:
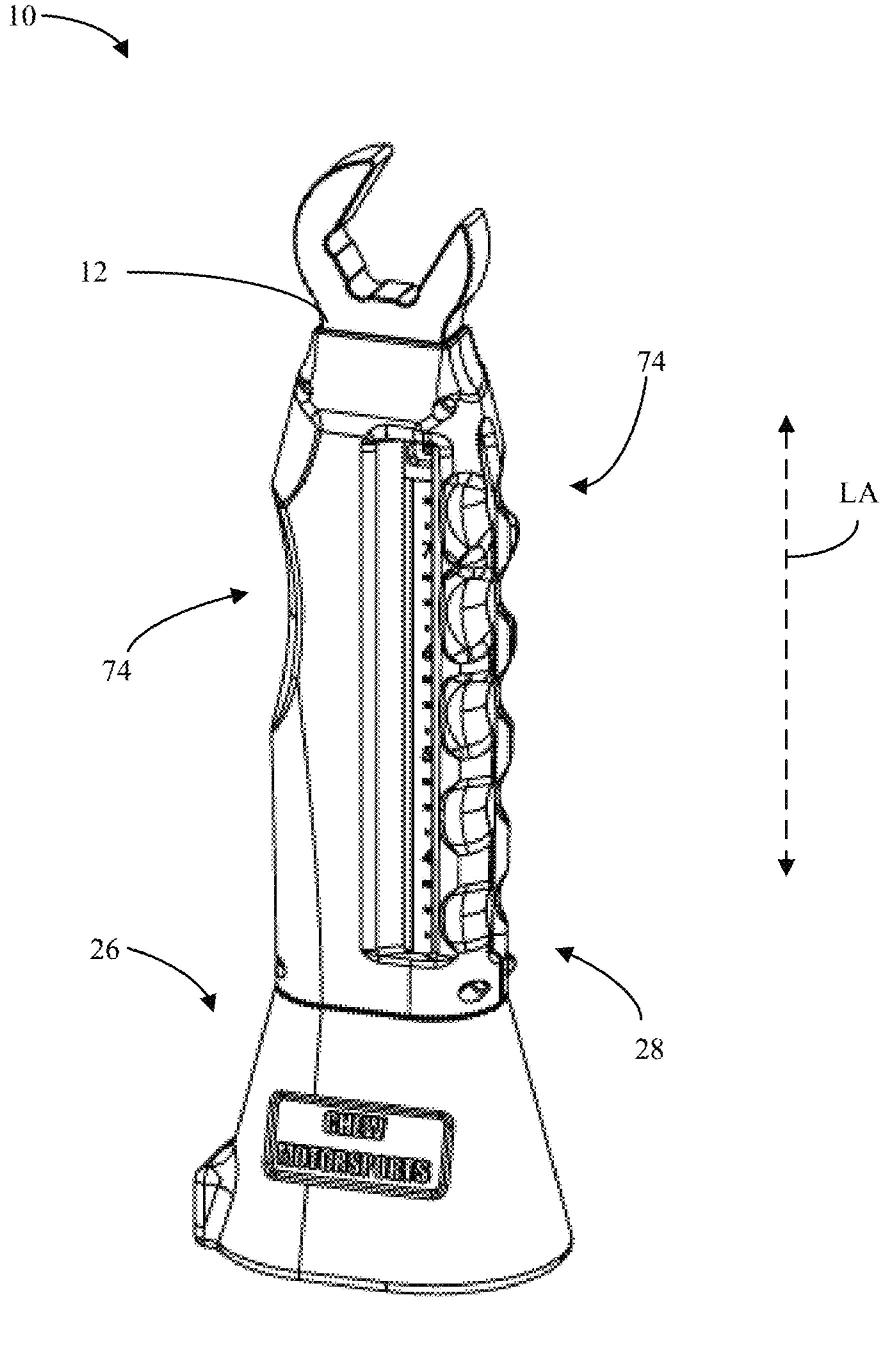
FIG. 1 is a perspective view of an example wheelie bar wrench system.
Figure 2:
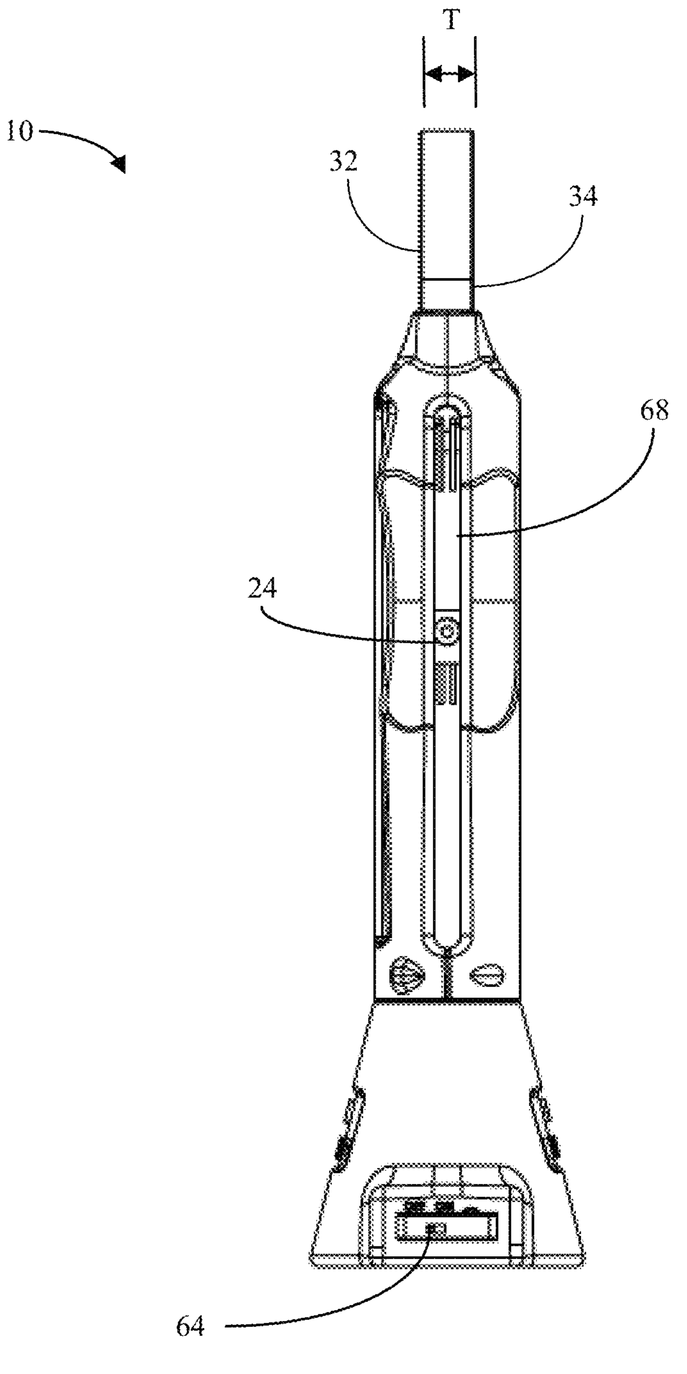
FIG. 2 is a side view of the wheelie bar wrench system shown in FIG. 1.
Figure 3:
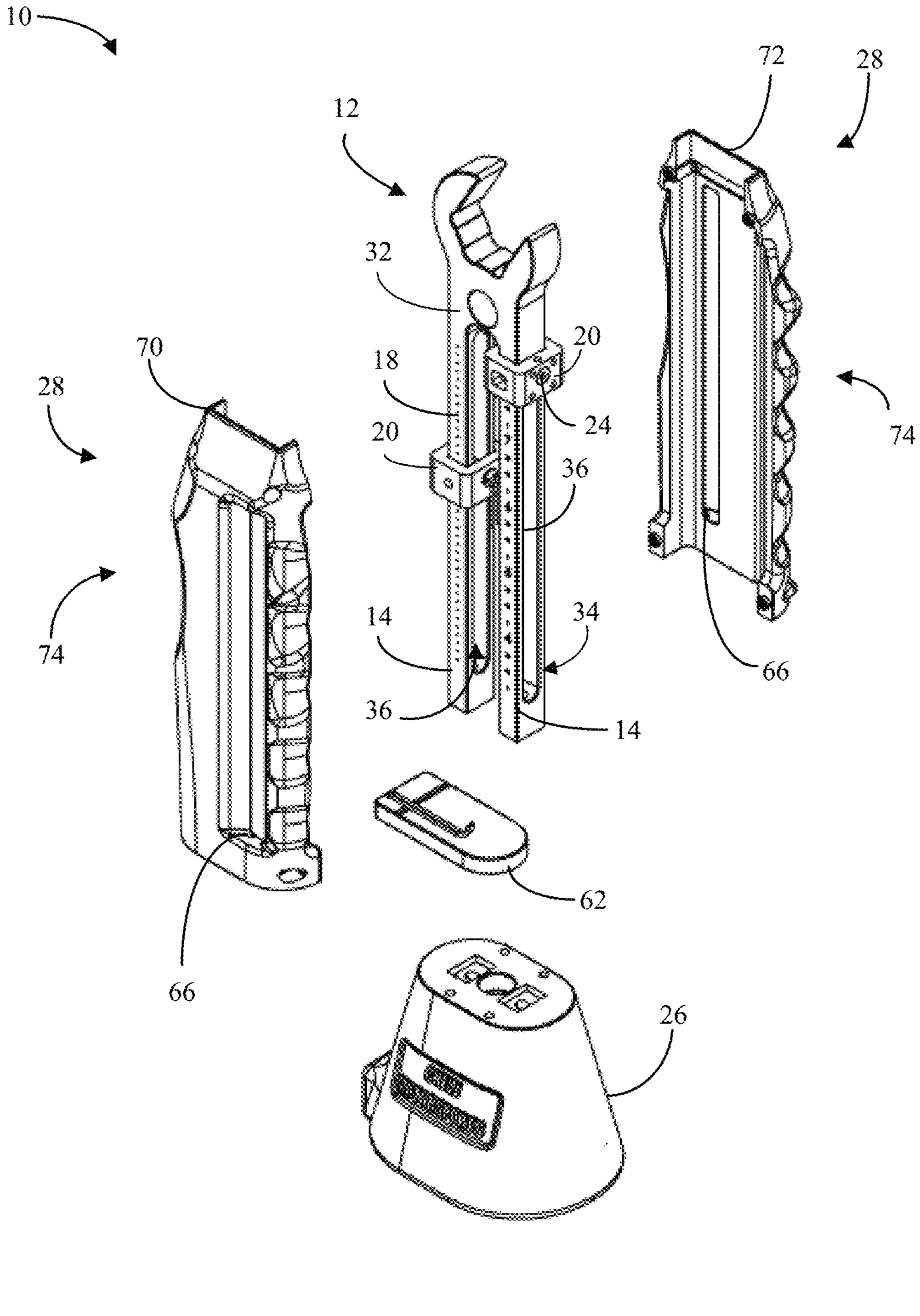
FIG. 3 is an exploded view of the wheelie bar wrench system shown in FIGS. 1 and 2.

Referring to FIGS. 1-3, an example of a wheelie bar wrench system in accordance with the present disclosure is generally indicated at reference number 10. Broadly the wheelie bar wrench system 10 includes a wrench 12 with one or more shaft portions 14 (shown in FIG. 3). Each shaft portion 14 has a front face 32 (shown in FIGS. 2 and 3) and a rear face 34 (shown in FIGS. 2 and 3) spaced apart from the front face 32 at a thickness T (shown in FIG. 2) of the wrench 12. Each shaft portion 14 includes a plurality of detents 18 (shown in FIG. 3) defined therein and spaced along a longitudinal axis LA of the wrench 12 and/or wheelie bar wrench system 10. For example, the wrench 12 may include a first plurality of detents 18 defined in the front face 32 of a first shaft portion 14, and a second plurality of detents 18 defined in the rear face 34 of a second shaft portion 14. Alternatively, the wrench 12 may include any arrangement and/or configuration of shaft portions 14 and/or detents 18 that enables the wheelie bar wrench system 10 to function as described herein.

The wheelie bar wrench system 10 includes one or more slider assemblies 20 (shown in FIG. 3), each configured to slide or move along a respective shaft portion 14. Each slider assembly 20 includes a laser device 24 configured to emit a laser beam for use in aligning the wheelie bar. In some examples, a laser device 24 may extend at least partially through a longitudinal slot 36 defined laterally through the shaft portion 14. In this manner, the laser device 24 may be configured to slide or move longitudinally within the longitudinal slot 36 as the slider assembly 20 is slid or moved longitudinally along the shaft portion 14 of the wrench 12.

The wheelie bar wrench system 10 may include a base 26 for supporting the wrench 12 thereon in a standing, upright position. The base 26 may be coupled to a bottom portion of the wrench 12 (e.g., at the bottom end of the shaft portion 14). The base 26 is configured to be free-standing and support the wrench 12 thereon. In some examples, the base 26 may have a frustoconical configuration with an elliptical lower surface. However, other free-standing base configurations may be used without departing from the scope of the present disclosure.

The base 26 may include a power source holder 62 (shown in FIG. 3) configured to hold a power source, such as a non-rechargeable battery or a rechargeable battery. One example battery suitable for use with the present disclosure is or includes a CR2032 battery. In some examples, the base 26 may include an actuating mechanism 64 (shown in FIG. 2) such as a power switch operably coupleable to the power source for selectively controlling power provided from the power source.

The wheelie bar wrench system 10 may include a housing assembly 28 for at least partially enclosing the wrench 12 therein. As shown in FIG. 3, the housing assembly 28 may include a front portion 70 and a rear portion 72 removably coupleable to the front portion 70. The housing assembly 28 may be shaped and/or configured to include one or more grip portions 74 for suitably and comfortably aligning a user's grip on the wheelie bar wrench system 10. For example, an outer surface of the housing assembly 28 may have a scalloped configuration defining the grip portions 74. In some examples, a first outer surface of the housing assembly 28 at a first side of the housing assembly 28 may define a plurality of concave indentations for receiving a plurality of fingers, and a second outer surface of the housing assembly 28 at a second side of the housing assembly 28 opposite the first side may define a single concave indentation for receiving a thumb.

The housing assembly 28 may define one or more first slots 66 each configured to provide access to a respective slider assembly 20. For example, one first slot 66 (e.g., a first access slot) may be defined through the front portion 70 to provide access to a first slider assembly 20, and/or another first slot 66 (e.g., a second access slot) may be defined through the rear portion 72 to provide access to a second slider assembly 20. Moreover, the housing assembly 28 may define one or more second slots 68, each configured to provide access to or clearance for the laser device 24 of a respective slider assembly 20. For example, one second slot 68 (e.g., a third access slot) may be defined between the front portion 70 and rear portion 72 at a first side of the housing assembly 28 to provide access to or clearance for the laser device 24 of a first slider assembly 20, and another second slot 68 (e.g., a fourth access slot) may be defined between the front portion 70 and rear portion 72 at a second side of the housing assembly 28 opposite the first side to provide access to or clearance for the laser device 24 of a second slider assembly 20.

Figure 4:
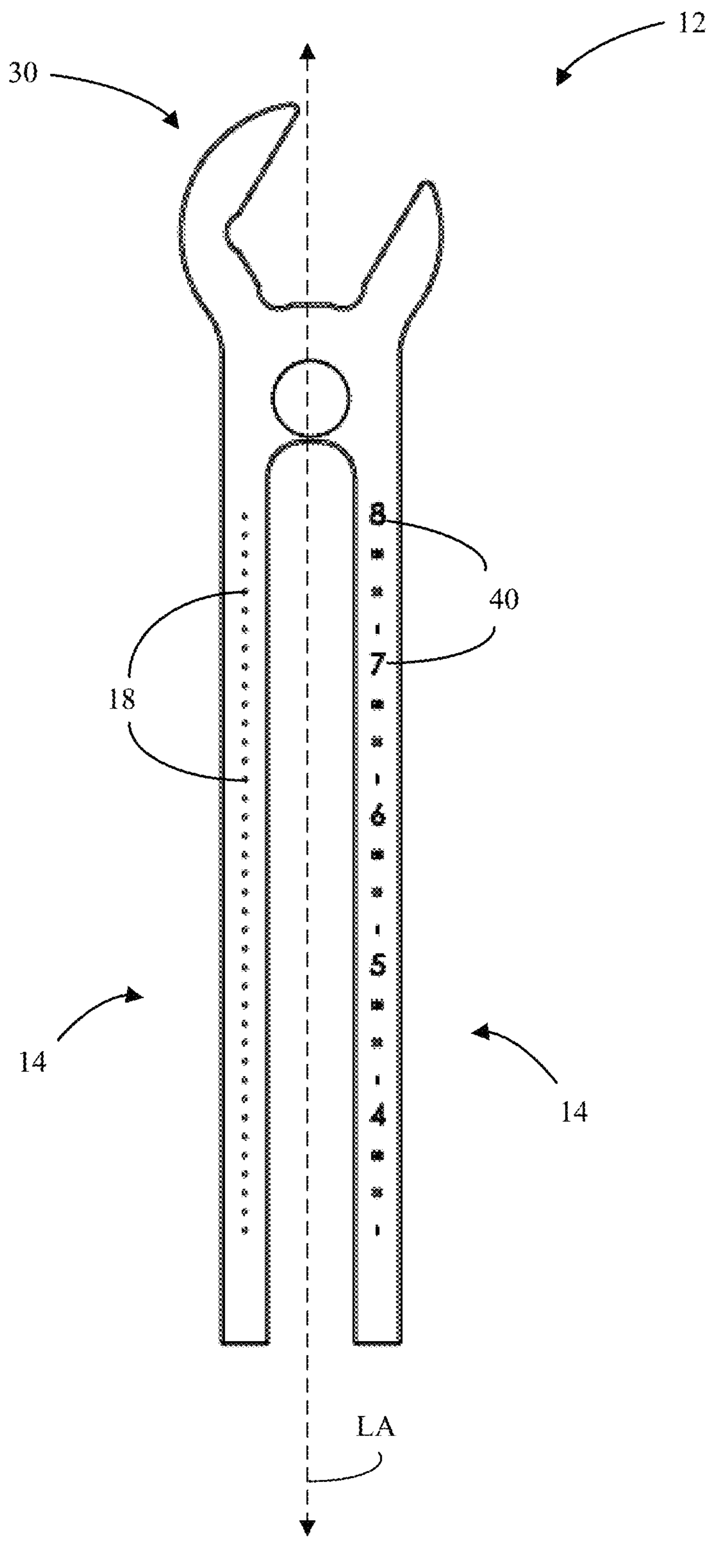
FIG. 4 is a front view of an example wrench that may be used in the wheelie bar wrench system shown in FIGS. 1-3.

In FIG. 4, an example wrench 12 is shown. As shown in FIG. 4, the wrench 12 may include a head portion 30 and one or more shaft portions 14 extending from the head portion 30 along a longitudinal axis LA of the wrench 12, such that the head portion 30 defines an upper portion of the wrench 12 and the bottom ends of the shaft portions 14 define a lower portion of the wrench 12. The head portion 30 may be used for tightening or loosening, i.e., untightening, nuts, bolts, and/or other fasteners. For example, the head portion 30 may be configured to engage a jam nut on the end of a wheelie bar for tightening or loosening the jam nut and/or engage a wheelie bar rod for moving the wheelie bar up or down. It will be apparent to one of ordinary skill in the art that the head portion 30 may be shaped and configured to accommodate a plurality of different jam nut or wheelie bar rod sizes.

As shown in FIG. 4, a shaft portion 14 may include a plurality of markers 40 spaced along the longitudinal axis LA of the wrench 12. Each marker 40 may correspond to a respective height measurement from a lower portion of the wheelie bar wrench system 10. In some examples, the markers 40 are on a face of the shaft portion 14 opposite that of the detents. For example, a first shaft portion 14 may have a first plurality of detents 18 defined in a front face 32 thereof and a first plurality of markers 40 on a rear face 34 thereof, and/or a second shaft portion 14 may have a second plurality of detents 18 defined in a rear face 34 thereof and a second plurality of markers 40 on a front face 32 thereof.

Figure 5A:
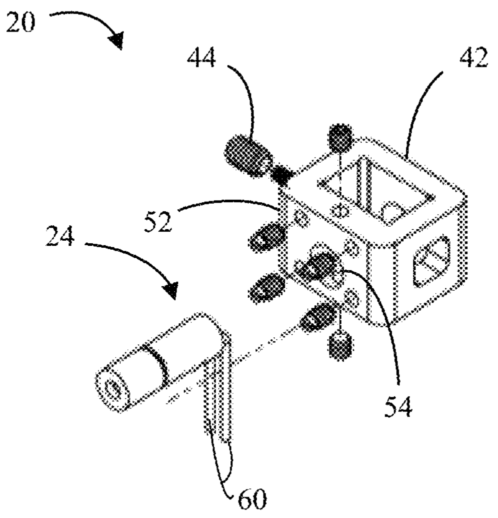
FIG. 5A is an exploded view of an example slider assembly that may be used in the wheelie bar wrench system shown in FIGS. 1-3.
Figure 5B:
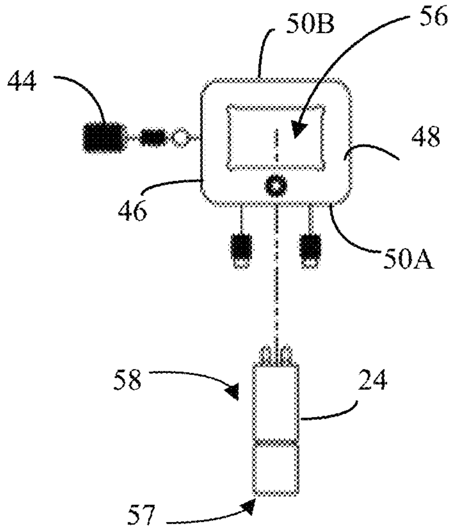
FIG. 5B is another exploded view of the slider assembly shown in FIG. 5A.
Figure 6A:
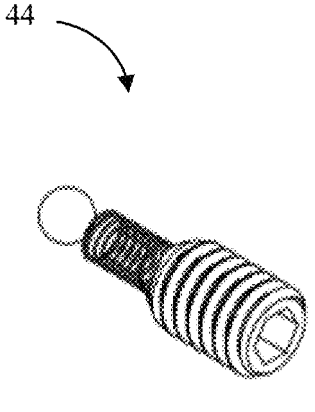
FIG. 6A is an enlarged view of an example ball-nose spring plunger that may be used in the slider assembly shown in FIGS. 5A and 5B.
Figure 6B:
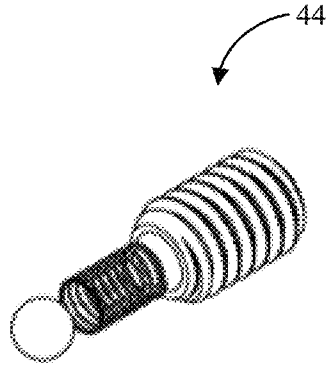
FIG. 6B is another enlarged view of the ball-nose spring plunger shown in FIG. 6A.

FIGS. 5A and 5B show an example slider assembly 20. The slider assembly 20 includes a slider body 42, a retractable device 44 configured to move between a retracted position and an extended position, and a laser device 24 configured to emit a laser beam for use in aligning the wheelie bar. As shown in FIGS. 5A and 5B, the slider body 42 includes a front wall 46, a rear wall 48 opposing the front wall 46, and first and second sidewalls 50A, 50B opposing one another and extending between the front wall 46 and rear wall 48. An inner surface of the front wall 46, rear wall 48, and sidewalls 50A, 50B defines a shaft opening 56 configured to receive a shaft portion 14 of the wrench 12 therein, such that the slider assembly 20 is slideable or moveable longitudinally along the shaft portion 14 of the wrench 12.

The front wall 46 has a first opening 52 defined therethrough. The retractable device 44 is configured to extend at least partially through the first opening 52. In some examples, the retractable device 44 is biased toward the extended position. As shown in FIGS. 5A and 5B, the retractable device 44 may be oriented such that the retractable device 44 is configured to extend radially inward (e.g., into the shaft opening 56). In this manner, the retractable device 44 may be configured to selectively engage the detents 18 of the shaft portion 14 extending through the shaft opening 56 as the slider assembly 20 is slid or moved longitudinally along the shaft portion 14 of the wrench 12. As shown in FIGS. 5A-6B, the retractable device 44 may be or include a ball-nose spring plunger. However, it will be apparent to one of ordinary skill in the art that other types of retractable devices may be used to engage the detents 18 without departing from the scope of the present disclosure.

The laterally-outer sidewall 50A includes a second opening 54 defined therethrough configured to receive a laser device 24 therein. In some examples, the laser device 24 may extend radially inward at least partially into or through the shaft opening 56. In this manner, when the shaft portion 14 is extended vertically through the shaft opening 56, the laser device 24 may extend laterally at least partially through the longitudinal slot 36 defined laterally through the shaft portion 14 such that the laser device 24 is configured to slide or move longitudinally within the longitudinal slot 36 as the slider body 42 is slid or moved longitudinally along the shaft portion 14. As shown in FIGS. 5A and 5B, the sidewall 50A may include one or more set screw holes defined therein, each configured to receive a set screw for use in positioning the slider body 42 within the housing assembly 28.

Figure 7:
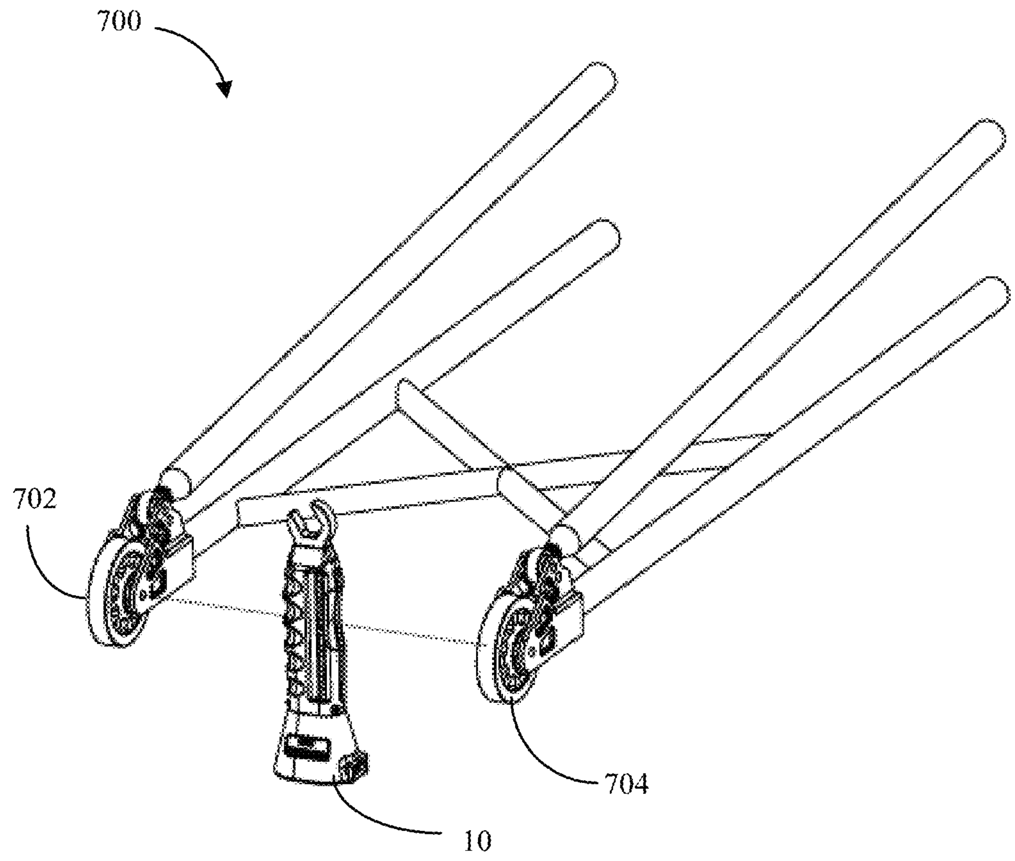
FIG. 7 is a perspective view of the wheelie bar wrench system shown in FIGS. 1-3 with an example wheelie bar.

The laser device 24 includes a laser body having a laser end portion 57 and a wire end portion 58. The laser body is oriented such that the laser end portion 57 faces laterally outward to emit a laser beam laterally outward for use in aligning the wheelie bar. One or more wires 60 extending from the wire end portion 58 may be configured for connecting the laser device 24 to a power source (e.g., at the power source holder 62). In some examples, a first shaft portion 14 may include a first laser device 24 and a second shaft portion 14 may include a second laser device 24 such that the laser devices 24 may be configured to emit laser beams in opposite directions from the wheelie bar wrench system 10. In this manner, the first laser device 24 may be used to emit a first laser beam towards a first wheel 702 of the wheelie bar, and the second laser device 24 may be used to emit a second laser beam towards a second wheel 704 of the wheelie bar, as shown in FIG. 7.

A method of forming the wheelie bar wrench system 10 will now be described. Prior to assembly of the wheelie bar wrench system 10, the individual components of the wheelie bar wrench system 10 are formed. In some examples, the wrench 12 may be manufactured from aluminum (e.g., using CNC machining), whereas other components such as the slider body 42, base 26, and/or housing assembly 28 may be manufactured from plastic (e.g., using 3D printing or injection molding). It will be apparent to a person of ordinary skill in the art that other materials and/or manufacturing methods may be used to manufacture the individual components of the wheelie bar wrench system 10 without departing from the scope of the present disclosure.

To assemble the wheelie bar wrench system 10, a slider body 42 including a front wall 46, a rear wall 48, and one or more sidewalls 50A, 50B extending therebetween is provided. The front wall 46 includes a first opening 52 defined therethrough, and the sidewall 50A includes a second opening 54 defined therethrough. The inner surface of the front wall 46, rear wall 48, and sidewalls 50A, 50B defines a shaft opening 56. A retractable device 44 configured to move between a retracted position and an extended position is inserted or extended at least partially through the first opening 52 defined through the front wall 46 of the slider body 42 such that the slider body 42 is configured to move the retractable device 44 with the slider body 42. A shaft portion 14 of the wrench 12 is inserted or extended at least partially through the shaft opening 56 defined by the inner surface of the front wall 46, rear wall 48, and the sidewalls 50A, 50B of the slider body 42 such that the slider body 42 is moveable longitudinally along the shaft portion 14 of the wrench 12 and such that the retractable device 44 is configured to selectively engage the plurality of detents 18 defined in the front face 32 of the shaft portion 14 as the slider body 42 is moved longitudinally along the shaft portion 14 of the wrench 12. A laser device 24 configured to emit a laser beam for use in aligning the wheelie bar is inserted or extended at least partially through the second opening 54 defined through the sidewall 50A of the slider body 42 and at least partially through the longitudinal slot 36 defined through the shaft portion 14 such that the slider body 42 is configured to move the laser device 24 with the slider body 42.

To install the base 26, one or more shaft portions 14 are coupled (e.g., bolted) to the base 36. Moreover, the or more laser devices 24 are electrically connected to a power source (e.g., via wires 60). For example, the wires 60 may be soldered or crimped together with battery contacts for proper connection to a battery. A housing assembly 28 may be used to at least partially enclose the one or more shaft portions 14, such that one or more first slots 66 defined by the housing assembly 28 provide access to the slider body 42 of each of the slider assemblies 20 and one or more second slots 68 defined by the housing assembly 28 provide access to the laser device 24 of each of the slider assemblies 20. For example, a front portion 70 of the housing assembly 28 may be coupled to a rear portion 72 of the housing assembly 28 (e.g., using screws) to at least partially enclose the wrench 12.

A method of using the wheelie bar wrench system 10 for adjusting a dual-wheel wheelie bar 700 shown in FIG. 7, will now be described. To use the laser devices for aligning the first and second wheels 702, 704, a user may turn on the laser devices by turning on power to the laser devices with the actuating mechanism 64 (e.g., turning the power switch from off to on). Next, the user may set each laser height by sliding each slider assembly 20 along the respective shaft portion 14 to a desired height, using the height markers 40 for reference. The retractable device 44 is biased towards the extended position such that, when the slider assembly 20 is at the desired height, the retractable device 44 engages the detent corresponding to the desired height to hold or secure the slider assembly 20 at the desired height. In some examples, the laser devices 24 may be set at different heights to achieve a staggered alignment of the first and second wheels 702, 704, which is common in drag racing. Alternatively, the laser devices 24 may be set at the same height. As shown in FIG. 7, the base 26 is positioned on the ground between first and second wheels 702, 704 of the dual-wheelie bar 700, such that each of the laser devices 24 is configured to emit laser beams toward the respective first and second wheels 702, 704 at the set laser heights. From here, the first and second wheels 702, 704 may be adjusted to correspond to the set laser heights. At the end of use, the power switch 64 is switched to off to conserve power, and the wheelie bar wrench system 10 is preferably stored in a dry environment.

Advantageously, the present disclosure provides a wheelie bar wrench system for accurately and easily adjusting a wheelie bar in drag racing. The free-standing base of the wheelie bar wrench system mitigates or eliminates measurement inaccuracies caused by misalignment of the wrench, as the base is configured to squarely support the wrench thereon for an accurate measurement without a user having the hold the wrench. Moreover, the slider assemblies and laser devices provide a fool-proof accurate solution for aligning wheelie bar wheel height, thereby mitigating or eliminating inaccuracies caused by eyeballing measurements.

Having described examples in detail, it will be apparent that modifications and variations are possible without departing from the scope of the invention defined in the appended claims.

When introducing elements of the present disclosure or the preferred embodiments(s) thereof, the articles “a”, “an”, “the” and “said” are intended to mean that there are one or more of the elements. The terms “comprising”, “including” and “having” are intended to be inclusive and mean that there may be additional elements other than the listed elements.

In view of the above, it will be seen that the several objects of the present disclosure are achieved and other advantageous results attained.

As various changes could be made in the above products without departing from the scope of the invention, it is intended that all matter contained in the above description and shown in the accompanying drawings shall be interpreted as illustrative and not in a limiting sense.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A wheelie bar wrench system for use in adjusting a height of a wheelie bar, the wheelie bar wrench system comprising:

a wrench comprising a shaft portion, the shaft portion extending along a longitudinal axis of the wrench and having a front face and a rear face, wherein the front face of the shaft portion has a plurality of detents defined therein spaced along the longitudinal axis of the wrench; and a slider assembly comprising a slider body, a retractable device, and a laser device, the slider body comprising a front wall, a rear wall, and a sidewall extending therebetween, wherein the retractable device extends through a first opening defined in the front wall, and the laser device extends through a second opening defined in the sidewall, and wherein an inner surface of the front wall, the rear wall, and the sidewall defines a shaft opening configured to receive the shaft portion of the wrench therein such that the slider assembly is moveable longitudinally along the shaft portion of the wrench, the retractable device configured to move between a retracted position and an extended position such that the retractable device selectively engages the plurality of detents as the slider assembly is moved longitudinally along the shaft portion of the wrench, the laser device configured to emit a laser beam for use in adjusting the height of the wheelie bar, and a base coupled to the shaft portion of the wrench, the base comprising a power source coupled to the laser device and an actuating mechanism coupled to the power source for selectively controlling power provided from the power source to the laser device.

2. The wheelie bar wrench system of claim 1, wherein the shaft portion of the wrench comprises a plurality of markers, each of the plurality of markers corresponding to a respective height measurement from a lower portion of the wheelie bar wrench system.

3. The wheelie bar wrench system of claim 2, wherein each of the plurality of detents corresponds to a respective marker of the plurality of markers.

4. The wheelie bar wrench system of claim 1, wherein the shaft portion has a longitudinal slot defined laterally therethrough and configured to receive the laser device therein.

5. The wheelie bar wrench system of claim 1, wherein the laser device comprises a laser body having a laser end portion, the laser body oriented such that the laser end portion faces laterally outward.

6. The wheelie bar wrench system of claim 1, wherein the base has a frustoconical configuration with an elliptical lower surface.

7. The wheelie bar wrench system of claim 1, further comprising a housing assembly configured to at least partially enclose the shaft portion of the wrench.

8. The wheelie bar wrench system of claim 7, wherein the housing assembly defines a first slot configured to provide access to the slider assembly and a second slot configured to provide access to the laser device.

9. The wheelie bar wrench system of claim 7, wherein the housing assembly comprises a front portion and a rear portion coupled to the front portion, wherein the front portion defines a first slot therethrough configured to provide access to the slider assembly, and the front portion and the rear portion define a second slot of the one or more slots therebetween configured to provide access to the laser device.

10. The wheelie bar wrench system of claim 7, wherein an outer surface of the housing assembly has a scalloped configuration.

11. The wheelie bar wrench system of claim 7, wherein a first outer surface of the housing assembly defines a plurality of concave indentations for receiving a plurality of fingers and a second outer surface of the housing assembly opposite the first outer surface defines a single concave indentation for receiving a thumb.

12. A wheelie bar wrench system for use in adjusting a height of a wheelie bar, the wheelie bar wrench system comprising:

a wrench comprising a first shaft portion and a second shaft portion, the first shaft portion and the second shaft portion each extending along a longitudinal axis of the wrench and having a front face and a rear face, wherein the front face of the first shaft portion has a first plurality of detents defined therein spaced along the longitudinal axis of the wrench, and the rear face of the second shaft portion has a second plurality of detents defined therein spaced along the longitudinal axis of the wrench;

a first slider assembly comprising a first slider body, a first retractable device, and a first laser device, the first slider body comprising a first front wall, a first rear wall, and a first sidewall extending therebetween, wherein the first retractable device extends through a first slider opening defined in the first front wall, and the first laser device extends through a first laser opening defined in the first sidewall, and wherein an inner surface of the first front wall, the first rear wall, and the first sidewall defines a first shaft opening configured to receive the first shaft portion of the wrench therein such that the first slider assembly is moveable longitudinally along the first shaft portion of the wrench, the first retractable device configured to move between a retracted position and an extended position such that the first retractable device selectively engages the first plurality of detents as the first slider assembly is moved longitudinally along the first shaft portion of the wrench, the first laser device configured to emit a first laser beam in a first direction for use in adjusting the height of the wheelie bar; and a second slider assembly comprising a second slider body, a second retractable device, and a second laser device, the second slider body comprising a second front wall, a second rear wall, and a second sidewall extending therebetween, wherein the second retractable device extends through a second slider opening defined in the second rear wall, and the second laser device extends through a second laser opening defined in the second sidewall, and wherein an inner surface of the second front wall, the second rear wall, and the second sidewall defines a second shaft opening configured to receive the second shaft portion of the wrench therein such that the second slider assembly is moveable longitudinally along the second shaft portion of the wrench, the second retractable device configured to move between a retracted position and an extended position such that the retractable device selectively engages the second plurality of detents as the second slider assembly is moved longitudinally along the second shaft portion of the wrench, the second laser device configured to emit a second laser beam in a second direction opposite the first direction for use in adjusting the height of the wheelie bar.

13. The wheelie bar wrench system of claim 12, wherein the first shaft portion has a first longitudinal slot defined laterally therethrough and configured to receive the first laser device therein, and the second shaft portion has a second longitudinal slot defined laterally therethrough and configured to receive the second laser device therein.

14. The wheelie bar wrench system of claim 12, further comprising a base coupled to the first shaft portion and the second shaft portion of the wrench, the base comprising a power source coupled to the first laser device and the second laser device, and an actuating mechanism coupled to the power source for selectively controlling power provided from the power source to the first laser device and the second laser device.

15. The wheelie bar wrench system of claim 12, further comprising a housing assembly configured to at least partially enclose the first shaft portion and the second shaft portion of the wrench, the housing assembly comprising a front portion and a rear portion coupled to the front portion, wherein the front portion defines a first access slot therethrough for providing access to the first slider assembly, the rear portion defines a second access slot therethrough for providing access to the second slider assembly, the front portion and the rear portion define a third access slot therebetween on a first side for providing access to the first laser device, and the front portion and the rear portion define a fourth access slot therebetween on a second side for providing access to the second laser device.

16. A method of forming a wheelie bar wrench system, the method comprising:

providing a slider body including a front wall, a rear wall, and a sidewall extending therebetween, the front wall including a first opening defined therethrough, the sidewall including a second opening defined therethrough, wherein an inner surface of the front wall, the rear wall, and the sidewall defines a shaft opening;

extending a retractable device at least partially through the first opening defined through the front wall of the slider body such that the slider body is configured to move the retractable device with the slider body, the retractable device configured to move between a retracted position and an extended position;

extending a shaft portion of a wrench through the shaft opening defined by the inner surface of the front wall, the rear wall, and the sidewall of the slider body such that the slider body is moveable longitudinally along the shaft portion of the wrench and such that the retractable device is configured to selectively engage a plurality of detents defined in a front face of the shaft portion as the slider body is moved longitudinally along the shaft portion of the wrench;

extending a laser device at least partially through the second opening defined through the sidewall of the slider body such that the slider body is configured to move the laser device with the slider body, the laser device configured to emit a laser beam for use in adjusting the height of the wheelie bar; and enclosing the shaft portion of the wrench using a housing assembly defining one or more slots configured to provide access to the slider body and the laser device.

17. The method of claim 16, wherein extending the laser device comprises extending the laser device at least partially through a longitudinal slot defined laterally through the shaft portion of the wrench.

18. The method of claim 16, further comprising:

coupling the shaft portion of the wrench to a base including a power source and an actuating mechanism coupled to the power source for selectively controlling power provided from the power source; and electrically connecting the laser device to the power source.

* * * * *